United States Patent [19]

Groeneweg

[11] Patent Number: 4,468,964
[45] Date of Patent: Sep. 4, 1984

[54] LIQUID METER

[75] Inventor: Adrianus Groeneweg, Dordrecht, Netherlands

[73] Assignee: ITT Industries, Inc., New York, N.Y.

[21] Appl. No.: 446,159

[22] Filed: Dec. 2, 1982

[30] Foreign Application Priority Data

Oct. 8, 1981 [NL] Netherlands .......................... 8104577

[51] Int. Cl.³ ............................................... G01F 3/08
[52] U.S. Cl. ...................................... 73/259; 418/260
[58] Field of Search .................. 73/259, 253; 418/260, 418/264, 174, 221

[56] References Cited

U.S. PATENT DOCUMENTS

| 538,659 | 5/1895 | Carscaden | 418/174 |
| 2,155,321 | 4/1939 | Marsh et al. | 73/259 |
| 3,683,694 | 8/1972 | Granberg | 73/259 |

Primary Examiner—Charles A. Ruehl
Attorney, Agent, or Firm—T. E. Kristofferson; A. D. Stolzy

[57] ABSTRACT

A vane-type liquid meter in which fluid input to and output from an annular measuring space are directed parallel to the rotational axis of a rotor. The fact that a separation block within the annular space is kept in place in a self-adjusting way gives the advantage of high accuracy.

2 Claims, 3 Drawing Figures

LIQUID METER

BACKGROUND OF THE INVENTION

This invention relates to metering apparatus, and more particularly to a flowmeter.

PRIOR ART STATEMENT

A prior art flowmeter is disclosed in German Patent Specification No. 2009879. An advantage of a meter with an axial feed and discharge of the liquid to be measured is that the meter is built up completely concentrically. However this known assembly has the drawback that high demands are made upon the tolerances of the geometry. A sufficient sealing between the different spaces and thus a sufficient accuracy of measurement is then not obtained.

From the experience and theory it follows that the gap between the revolving rotor and the stationary housing may only amount to some few 10 microns. This means that within this small clearance there must be room if the housing is out of round. The same is true if the rotor is out of round. The same is also true if the bearing is eccentric. The same is also true if the bearing ring and the rotor are eccentric. If it is possible to meet the tolerance requirements it is certainly very costly.

SUMMARY OF THE INVENTION

An object of the invention is to improve the construction of a flowmeter in such way that the tolerance requirements can be decreased. This is achieved according to the invention by omitting a seal between the stator and the inner side of the housing in that the rotor itself is completely sealed in a radial direction. Moreover the separating means is not rigidly connected to the housing but disposed in a self adjusting condition.

BRIEF DESCRIPTION OF THE DRAWINGS

The invention will now be described in more detail while referring to the drawing in which.

DESCRIPTION OF THE PREFERRED EMBODIMENT

Figure 1:
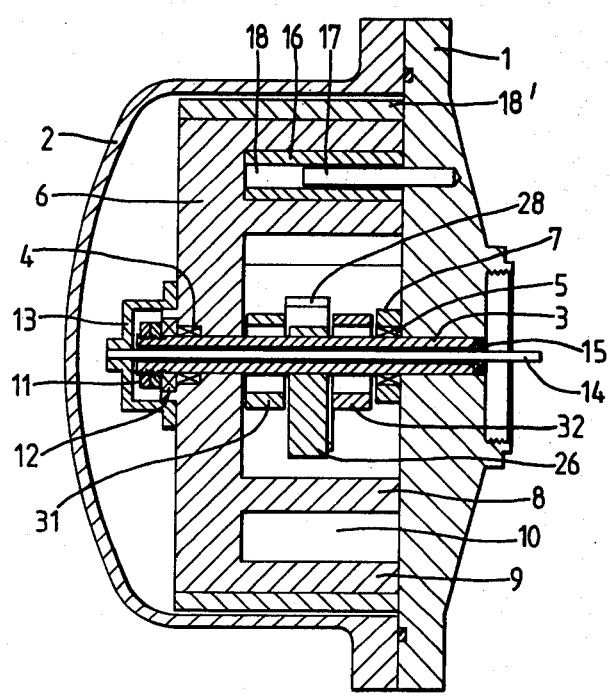
FIG. 1 is a longitudinal sectional view of a flowmeter constructed in accordance with the present invention.

In FIG. 1, a base plate 1 of a flowmeter is shown in liquid tight sealing engagement with a housing 2. An elongated sleeve 3, rigidly connected to the base plate 1, carries two bearings 4 and 5 by which a rotor 6 is mounted for rotational movement within housing 2. A ring 7 is rigidly connected to rotor 6 by means of spokes (not shown). The rotor includes a disk shaped part and two concentric annular parts 8 and 9 which are in movable but substantially liquid tight engagement with the base plate 1.

In this way an annular measuring space 10 is formed. The rotor 6 is fixed in axial position in that it is retained between the base plate 1, nuts 11 and a thrust bearing 12. A spider 13 forms a mechanically rigid connection between rotor 6 and a shaft 14. The shaft 14 may drive an outside indicating device. The shaft 14 is supported by a bearing 15. In the annular measuring space 10, a separating means 16 is provided which is retained by a pin 17 which extends with some clearance through a bore 18 in the separating means 16. The pin 17 is rigidly connected to the base plate 1. The rotor 6 is sealed in a liquid tight manner.

The inlet and outlet ports are shown at 19 and 20, respectively. Four substantially square vanes 25 are mounted for a slidable movement in the rotor-parts 8 and 9. Adjacent pairs of vanes 25 enclose a predetermined volume inside the measuring space.

Figure 3:
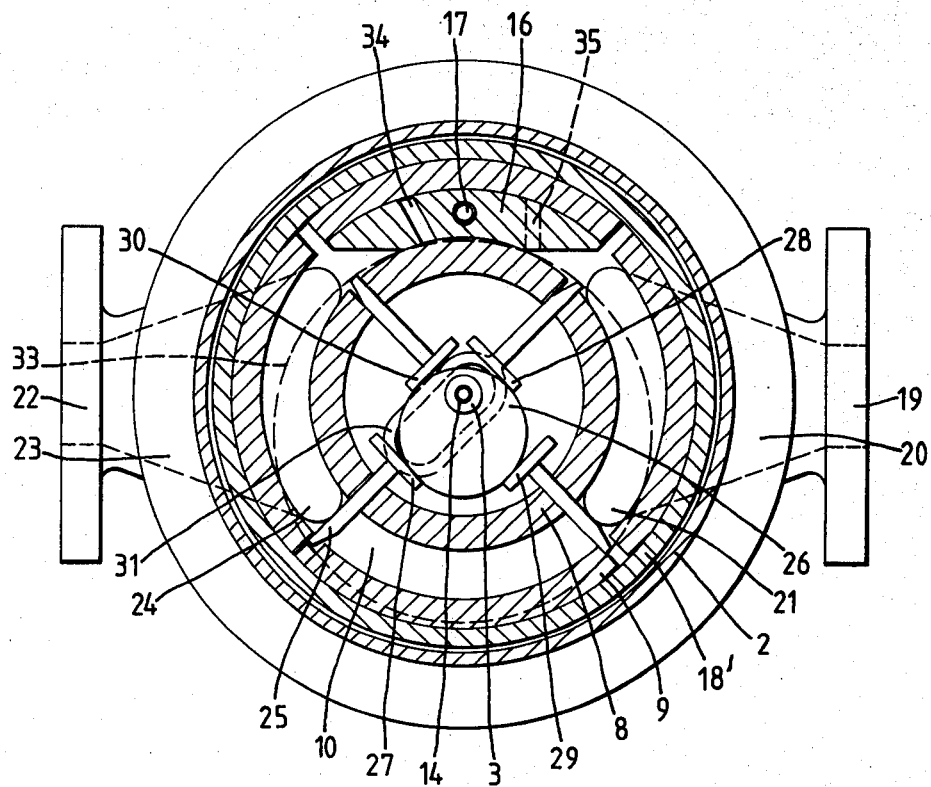
FIG. 3 is a vertical sectional view that has been broken away.

The correct inward and outward sliding movements of the vanes 25 and brought about by a control mechanism including a fixedly mounted disc 26 which is enclosed by the flat sides of tables 27, 28, 29, 30 Tables 27-30 are fixed to vanes 25. A dotted line 33 shows the path which is described by the ends of the vanes when the rotor rotates. In this separating means are shown at 16 in FIGS. 1 and 3. A separating means is provided with a bore 34 and at its side adjacent the base plate with a groove 35.

Figure 2:
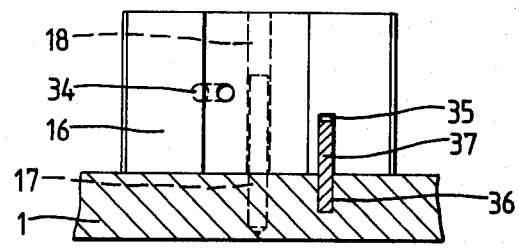
FIG. 2 is a transverse sectional view of the flowmeter shown in FIG. 1.

In FIG. 2 the separating means is again illustrated. One sees in this figure that the base plate 1 is also provided with a groove 36. The location of groove 34 corresponds to that of a groove 35 in the separating means. In both grooves there is received a sealing strip 37 which is made of an elastic material.

The operation, of the flowmeter is as follows. The inlet pressure of the liquid to be measured enters at 19. The liquid then exerts a force in the measuring space 10 on the vane. This thereby causes a clockwise rotating torque to act upon the rotor. This torque is not compensated for by a counterclockwise rotating torque produced by the presence of the sealing action of the separating means. Thus the rotor 6 will rotate the control mechanism to the right. The control mechanism comprises the stationary disc 26, the tables 27-30 and the bridges 31 and 32. The movement pattern is chosen so that between two vanes (in FIG. 3 the lower most quarter) a predetermined constant volume is enclosed within the measuring space and transported from the inlet connection 19 to the outlet connection 22. In this way a fixed ratio between a revolution of the rotor and an amount of liquid which is established.

To make an accurate measurement possible, it is necessary to decrease as much as possible any leakage from the inlet-to-outlet connection. To prevent leakage from the rotor 6 the cylindrical outside of the rotor is made liquid tight. This can be done by fitting a casing 18' around the rotor. The grooves in the outer part of the rotor 6 are allowed to extend to the outside. The separating means is not rigidly fixed to the base plate 1 but mounted for a movement by choosing the diameter of the bore 18 in the separating means to be somewhat larger than that of the pin 17 rigidly connected with the base plate 1. Thereby the separating means becomes self adjusting. As a result of the clockwise rotation of the rotor 6 a liquid wedge will be formed between the separating means at the portion of its cylindrical outer side located near the outer side and the opposing inner side of rotor part 9. The said liquid wedge presses at the outlet side of the separating means with its inner side against the outside of the rotor part 8. By both substantially diametrically oppposing pressures exerted on the separating means a self adjusting sealing is obtained which improves with increasing pressures. By the presence of the sealing strip 37 the leakage between the separating means and the base plate is directly blocked.

In case a liquid with bad greasing properties must be measured, a bore 34 with an appropriate cross section can be formed in the separating means. Between the cylindrical inner side of the separating means and the cylindrical outer side of rotor part 8 at the outletside a sufficient liquid film is formed.

I claim:

1. Liquid meter provided with:

a cylindrical rotor of which the section parallel to the axis on both sides thereof is U-shaped, the ends of the legs sealing against a flat base plate so that an annular measuring space is formed inlet and outlet ports being provided at diametral points with respect to each other in the base plate and opening in the measuring space, the inlet serving as a feeding aperture through which medium is fed to the measuring space and the outlet serving as discharge aperture through which medium is discharged from the measuring space, a plurality of radially directed vanes which are guided by slots in the rotor are moved radially by a control mechanism in such a way that at each revolution of the rotor a predetermined amount of medium is always enclosed and is transported from the inlet to the outlet, separating means placed inside the annular measuring space at a location opposite to the place enclosing the predetermined amount of medium, characterized in that the cylindrical outer side of the rotor is made medium tight by means of parts rotating with the rotor, the separating means being mounted for a self adjusting action.

2. Liquid meter according to claim 1, characterized in that the cylindrical outer side of the rotor is provided with a casing rotating with the rotor.

* * * * *